3,580,963
VAPOR DEPOSITED METAL POLYESTER
POLYCONDENSATION CATALYSTS
Herbert Kurzke, Bobingen, Wolfgang Goltner, Kriftel, Taunus, and Walter Seifried, Wiesbaden, Germany, assignors to Farbwerke Hoechst Aktiengesellschaft vormals Meister Lucius & Bruning, Frankfurt am Main, Germany
No Drawing. Continuation of application Ser. No. 481,396, Aug. 20, 1965. This application Aug. 1, 1969, Ser. No. 849,578
Claims priority, application Germany, Aug. 22, 1964, F 43,809
Int. Cl. C08g 17/015, 39/10
U.S. Cl. 260—860
4 Claims

ABSTRACT OF THE DISCLOSURE

A process has been provided for dispersing solids in a liquid or a melt by combining a solid to be dispersed with a solid organic carrier which is soluble in the liquid or melt and introducing the combination of the solid and the solid organic carrier material into the liquid or melt whereby the solid organic carrier material is dissolved, and thereby the solid is accordingly dispersed in the liquid or melt.

---

This application is a streamlined continuation application of Ser. No. 481,396, filed Aug. 20, 1965, and now abandoned.

The present invention relates to a process for dispersing solids in liquids and/or melts.

It is known that the catalytic activity of catalysts largely depends on the surface and the distribution of the catalyst in the reaction mixture. In order to achieve optimum conditions the catalysts are applied to inorganic carrier materials having large surfaces. Processes have also been described in which the catalyst is finely ground and treated for a prolonged period of time in an oscillating mill for improving comminution. It has likewise been proposed to produce large surfaces and to increase thus the activity by applying the catalyst as vapor to an inorganic carrier. A drawback of this method is the detaching or peeling off of the active layer in the form of more or less large particles, which have a detrimental effect as inhomogeneities in the working up of such mixtures and on the properties of the final products made therefrom. Moreover, in the known processes a great proportion of the catalyst cannot participate in the reaction because of the relatively thick layer on the carrier metal.

Because of the deficiences described above, all these methods are insufficient, the solids being not distributed finely enough in the reaction masses. Since the reaction speed of catalytic reactions depends on the concentration of really active centers, in the cases of a poor distribution the concentration of the catalyst must be increased so that a large proportion of inactive catalyst substance is entrained. This fact does impair not only the economy but also the possibility of separation of the said catalyst substances being present in an increased amount from the reaction products and therewith the quality of the final products. It is known that larger proportions of catalyst which have not been separated may cause troubles in the further working up owing to secondary reactions and bring about a chemical instability of the reaction products. When pigments are dispersed agglomerates which have not been well distributed impair the quality of the final products by the formation of so-called fish-eyes.

The present invention provides a process for dispersing solids in liquids and/or melts wherein the solid is distributed in or supported on an organic carrier material which is soluble in the liquid or melt or which in the molten state can be finely distributed and the carrier containing the solid is dissolved in the liquid or the melt or finely distributed by melting.

The process according to the invention can be used in various fields. In the first place, the process is suitable for introducing catalysts or catalyst mixtures in finest distribution in any reaction mixture, preferably in the preparation of polymers or polycondensation products.

The process guarantees an optimum distribution of the catalyst in the reaction mixture and, consequently, brings about an improvement of the catalytic effect.

When solids are to be distributed in a particularly fine form in solutions or melts, this can be achieved by the process according to the invention without the formation of distributing agglomerates.

As solids there may be considered in the first place metals or metal compounds, such, for example, as metal oxides or metal salts of organic or inorganic acids, furthermore organo-metal compounds or complex compounds, which are advantageously applied to the carrier by vaporization, in general under reduced pressure. Metal oxides or metal compounds which can be converted into the metal by a chemical reaction can also be used as solids. The solids can be applied to the carrier also from solutions or dispersions with subsequent elimination of the solvent. Alternatively, the solids can be distributed in high polymers by known methods and a solution, dispersion or melt of the mixtures obtained can be worked up to yield shaped structures, such, for example, as fibers, bands, bristles, wires or films, which serve as carrier. In this case the solid to be distributed is incorporated in the carrier.

The solids can be applied to or distributed in the carrier either continuously or discontinuously, depending on their type and the method of application or incorporation used.

In the process according to the invention there can be used as carriers all organic substances with the aid of which self-supporting films or filaments can be prepared. There can be used cellulose and cellulose derivatives as well as natural and synthetic albuminous products, furthermore resins. For the reason of economy or because of the versatility of their properties there are advantageously used as carriers fibers or films of synthetic, fiber- and film-forming plastics, such, for example, as polyolefins and olefin copolymers, polyamides, polyimides, polyesters, polycarbonates, polyacetals, polyethers, polyvinyl or polyacryl compounds, or the mixtures and copolymers thereof. Chemically modified polymers can also be used as carrier substances. The polymers are chemically modified by substitution or addition reactions, for example graft polymerization, hydrolysis, acylation, or physically, for example by irradiation or by heating to a desired temperature in the usual technical apparatus. Above all, the waste obtained in the production of synthetic fibers and films is used as carrier material.

The carriers in the form of films or fibers can be oriented in one or two directions by conventional methods by drawing. In order to attain additional effects, for example a "depot effect" known from chemotherapeutics, the layer of solid applied to a carrier can be additionally covered with a solution, dispersion or melt of the same material or with another film-forming material. Owing to the fact that on dissolving or melting the carrier the viscosity of the liquid or the melt is often increased, special effect can be produced, for example with polymerization reactions the premature occurrence of the known gelling effect, which may involve an increase of the reaction speed often desired and a change in the molecular weight distribution. Therefore, in special cases the carrier may serve as thickening agent, its presence can influence the fluidity of polymer melts or solutions in the desired direction. The question whether films or filaments are to be used depends on the type of solid, the method of application to the carrier or introduction into the carrier and on the intended application.

The selection of the carrier with regard to its composition depends on the reaction conditions in each case, such as time, temperature, presence of solvents and on the type of reaction components. The compatibility of the carrier with the reaction mixture, reaction solution or reaction melt should be given to as large an extent as possible. In the case, of a limited miscibility, however, special effects can be produced, for example the effect of a protecting colloid or the formation of cell structures after cooling the mixtures.

The process according to the invention is not limited to the fine distribution of catalytically effective substances in reactions of the compounds of low or high molecular weight. It can be applied in all cases where, for example, metals or metal compounds are to be reacted or dissolved quantitatively and rapidly, for example metal-organic reactions. Reactions of this type are, for example, the Grignard and Guerbet reactions.

The process according to the invention has also proved advantageous for the hydrogenation with metallic catalysts.

The process is not limited to the fine dispersion of metals or metal compounds for catalytic or chemical reactions. It can be used in all cases in which a solid is to be finely distributed in a liquid medium. Thus pigments of any type can be dispersed in solutions or melts without the formation of agglomerations. Substances which belong to this group are, above all, the delustering agents often used in the production of fibers, for example titanium dioxide. By the process according to the invention also other pigments can be finely distributed in spinning solutions or spinning melts and by the addition of the dissolved carrier the utilitarian properties of the articles, such as filaments or films made from the said solutions or melts, can be considerably improved. When a pigmented carrier of a hydrophilic substance is added to solutions or melts of hydrophobic polymers the moisture absorption of the hydrophobic articles is increased and often the transparency, drawability and dye receptivity are simultaneously improved.

As hydrophilic, fiber- or film-forming carrier substances there can be particularly used polyalkylene oxides, polyvinyl alcohol, copolymers of vinyl acetate with one or several vinyl or acryl monomers and the reaction products thereof. Soluble films or fibers of hydrophilic polyamides or polyesters may likewise be used as carriers. As hydrophobic products for the manufacture of films or fibers from solutions or melts are suitable polyamides with 2–16 carbon atoms in the basic molecule, cellulose derivatives, homo- and copolymers on the basis of acrylonitrile, methacrylonitrile or vinylidenedinitrile, polyacetals and polymers of α-olefins or substituted α-olefins. Suitable solvents for the preparation of the spinning solutions are organic or inorganic solvents which are appropriate for the respective polymer. More particularly, there are mentioned nitric acid, mono-, di-, and unsubstituted aliphatic carboxylic acid amides, dimethyl sulfoxide, phosphoric acid tris-dimethylamide, carboxylic acids, substituted carboxylic acids, carboxylic acid derivatives, such as nitriles, esters, lactams, or lactones, ketones, liquid or aliphatic or aromatic hydrocarbons or the derivatives thereof which are liquid or melted at higher temperatures. It is likewise possible, of course, to use solvent mixtures. According to the requirements the solutions may contain substances having an antistatic or flame-proofing effect, optical brighteners, plasticizers, crosslinking agents and vulcanization agents as well as other fillers. By the addition of electrically conductive or semi-conductive substances fibers or films can be produced having conductive properties which are especially interesting in electrotechnical fields of application. Sometimes it may be desirable to add to the spinning solutions or melts monomeric compounds which, during dissolution, or thereafter during the formation of fibers or films, undergo polycondensation, polymerization, grafting reactions, cross-linking reactions, or polymerize in the presence of ions or radical-liberating agents. In some cases it may be necessary to add to the spinning solutions or melts initiators catalysts or compounds which take up by-products formed during condensation. In addition to isocyanates, epoxides, lactams, lactones and the compounds suitable for polymerization reactions, such as two- and polybasic aliphatic, cycloaliphatic, and aromatic carboxylic acids, polyhydric alcohols, primary aliphatic, cycloaliphatic, or aromatic di- and polyamines, di- and polyamines having one or several tertiary nitrogen atoms, there are proposed ethylene imine compounds for the production of polymer products according to the invention. The latter class of compounds can polymerize at a pH below 8 to yield products of high molecular weight which have a favorable effect on the water absorption, surface conductivity, and dye receptivity of the fibers or films made therefrom. The concentration and type of the additions depend on the desired effect and can be determined in each case by preliminary tests.

With the aid of the process according to the invention carriers covered with salts or solid polymers can be dissolved in dispersions or suspensions, whereby cell structures are formed by the fine distribution of the insoluble solids. The dissolved carriers may then act as binding agent. These effects can be used for the manufacture of foamed materials and for the consolidation of fleeces and particularly for the manufacture of artificial leather.

It is obvious that the thickness of the layer of solid applied to the carrier has a decisive influence on the course of reaction. In the case of reactions with metal catalysts thin layers are preferred. For polycondensations with metal catalysts layers having a thickness of less than $1\mu$, preferably less than $0.5\mu$ are especially favorable. It is advantageous to determine by preliminary tests the influence of the layer thickness and the concentration of the solid, calculated on the carrier substance, on the dispersability and the reaction speed. The same applies, in principle, to any homogenization of solids according to the process of the invention. The concentration of solid on or in the carrier can, therefore, vary within a wide range of from 0.001 to 5% by weight and there above, calculated on the carrier substance. Carriers with layers of vaporized metals for catalytic reactions shall not contain, in general, more than 10% of metal, referred to the weight of the carrier. In special cases, for example the manufacture of foamed materials this value may, however, be exceeded. The conditions are analogous when pigments are added, for example to spinning solutions for the manufacture of artificial filaments, in this case, too, the pigment concentration should not exceed 10% by weight, referred to the weight of the carrier.

It has surprisingly been found that the process according to the invention can be successfully used for the manufacture of linear polyesters on the basis of dicarboxylic acids and ethylene glycols. According to a known process (Belgian Pat. 652,714) pulverized, metallic antimony is used as condensation catalyst. When the polycondensation products prepared in the presence of antimony are worked up to films or fibers defects may occur in the shaped articles because of the included agglomerations of metal particles. During further processing these defects cause troubles, for example the material may tear on drawing. Films made from materials of this type are little suitable for electro-insulation. When a catalyst is used for polycondensation consisting of metallic antimony applied to porous inorganic carrier materials by vaporization, a peeling off of the metal layers is observed and the larger particles are inhomogeneously distributed in the reaction mass. When such products are further processed considerable troubles are, of course, encountered, particularly owing to the non uniform flow of the reaction mass, and because of tearing of the shaped articles directly behind the nozzle. Moreover, the peeled off particles shorten considerably the time of operation of the filter installed in front of the nozzle.

It is remarkable that the process according to the invention increases the reaction speed of the polycondensation involving a reduction of the catalyst concentration. Simultaneously, the quality of the polyesters produced according to the invention is better than that of polyesters made by conventional methods. The advantages are in an improvement of the color, a low number of fish eyes, a low content of carboxyl groups and oligomers and an excellent thermostability and stability towards chemicals of the polyesters. When products of this type are processed the filters can be used for a longer period of time owing to the better distribution of the catalyst, whereby the spinning process is simplified and the quality of the shaped articles is considerably improved.

The process according to the invention practically enables for the first time other catalytically active metals than antimony to be used, for example metallic tin.

The aforesaid advantageous properties, such as thermostability, low number of fish eyes, low content of carboxyl groups and oligomers allow of adding film or fiber waste, as obtained in the production of polyesters and thermally decomposed to a considerable extent owing to the working conditions, to the polycondensation mass for being subjected again to condensation. In spite of a contamination of the waste, for example by machine oil, a polyester of high quality can be produced in this manner. Hitherto, it has been necessary to decompose the waste by relatively expensive methods by alcoholysis or hydrolysis to obtain the basic structural units. As regards thermostability, the crude material for example, polyesters produced by the process according to the invention are far superior to materials produced by conventional methods. This is surprising, the more so since waste can be added in an amount of up to 70% by weight and there above, referred to the dicarboxylic acid dialkyl ester used, preferably up to 50%. It is also surprising that prior to being re-used the polyester waste need neither be purified chemically or mechanically, nor dried. When fiber waste is added it is suitable, in general, but not absolutely necessary, to eliminate the spinning preparation.

The process according to the invention is especially suitable for the polycondensation, heterogeneously catalyzed by metals, preferably antimony or tin, of aromatic, aliphatic, cycloaliphatic dicarboxylic acids with aliphatic, straight chain or branched, or cycloaliphatic diols with 2 to 12 carbon atoms. As dicarboxylic acids there can also be used substituted aromatic dicarboxylic acids or mixtures of various dicarboxylic acids and diols.

In principle, the process of the invention can be used for all reactions carried out with the aid of catalysts, particularly polymerization and polycondensation reactions. It is especially suitable, as already mentioned above, for the manufacture of fibre- or film-forming aromatic polyesters. In this case, the process of the invention can be used for the ester interchange reaction as well as for the polycondensation.

Because of their good compatibility, products on the basis of polyesters are preferably used as carriers. Polycarbonates as well as polymethacrylates and polyolefins are likewise suitable. In general, any organic product can be used which forms self-supporting films by a customary process from a solution, dispersion or melt. Furthermore, films can be used which during polycondensation may thermally decompose to yield inert decomposition products that can be readily removed from the melt or remain therein, for example as plasticizer.

The film serving as carrier can be added to the reaction mixture in the form of a band or in ground form either directly or as a dispersion. Suitable dispersing agents are all inert organic solvents, preferably the glycols used for the polycondensation reaction. The process is not limited to a discontinuous mode of operation; it can advantageously be carried out continuously in suitable devices for the production of polyesters.

The concentration of the added solid, calculated on the solution or melt, preferably antimony or tin, must be adapted to the experimental conditions in each case and depends on the thickness and the surface conditions of the solid when the solid is applied to the surface of the carrier. When antimony layers of less than $0.5\mu$ are applied, the metal is required in an amount of from 0.05 to 0.0002% by weight, referred to the polycondensation mixture. These data can naturally be considered as approximate values only, since the catalyst activity depends on the purity of the metal used and of the other starting compounds and on the metal surface.

The following examples serve to illustrate the invention but they are not intended to limit it thereto, the parts being by weight unless otherwise stated.

EXAMPLE 1

A mixture of 100 parts of dimethyl terephthalate, 80 parts of ethylene glycol and 0.023 part of zinc acetate ($x2H_2O$) was heated in a three-necked flask provided with stirrer, distilling column with connected condenser and thermometer in a manner such that the temperature in the reaction mixture gradually rose from 158° C. to 205° C. within 90 minutes. At a temperature at the head of the distilling column which was between 65–67° C., 39 parts of methanol distilled off.

The mixture was transferred in the molten state into a vacuum reactor provided with stirrer and fractionating column. As heating source an oil bath was used. To the mixture were added 0.025 parts of triphenyl phosphite and a film of polyethylene terephthalate, to which vaporous metallic antimony had been applied, which had a size of 275.4 cm.$^2$, a thickness of $50\mu$ and had been cut to squares of 1 cm.$^2$. The antimony layer applied in a high vacuum had a thickness of less than $0.5\mu$, the amount of antimony added was 0.01 part.

With continuously rising temperature and simultaneous increase of the vacuum, the reaction was carried out under the conditions indicated in the following table:

| Time in minutes | Pressure, mm. of mercury | Bath temperature, ° C. |
|---|---|---|
| 0–10 | 660 | 236 |
| 10–20 | 560 | 247 |
| 20–30 | 460 | 246 |
| 30–40 | 360 | 248 |
| 40–50 | 260 | 249 |
| 50–60 | 160 | 249 |
| 60–70 | 120 | 249 |
| 70–80 | 80 | 250 |
| 80–90 | 60 | 251 |
| 90–100 | 40 | 252 |
| 100–110 | 20 | 256 |
| 110–120 | 1 | 257 |
| 120–180 | 0.4 | 275 |

After 180 minutes of reaction, colorless, drawable filaments having a melting point of 260.5° C. were drawn from the melt. The specific viscosity was 0.85, the content of carboxyl groups 10.8 m. val./kg., and the content of constituents soluble in chloroform 0.6%.

EXAMPLE 2

0.020 parts of triphenyl phosphite and then 0.03 parts of antimony, applied as a vapor in a high vacuum to a film of $20\mu$ of polyethylene terephthalate (surface area 85 cm.$^2$, melting point 260.5° C., $\eta$ spec. 0.73), were added to an ester interchange mixture obtained as described in Example 1. The metal was distributed by dissolution of the carrier film at 200° C. in the molten ester interchange product.

After having carried out a polycondensation reaction as described in Example 1, the colorless polyester had a specific viscosity of 0.56, a content of carboxyl groups of 19 m. val./kg., a melting point of 160.5° C. and a proportion of constituents soluble in chloroform of 0.58%. The material could be worked up into drawable, colorless filaments or films.

EXAMPLE 2a (comparative ex.)

Under the same reaction conditions an ester interchange mixture specified in Example 2, admixed with 0.025 part of triphenyl phosphite and 0.03 part of antimony trioxide, was polycondensed. The product obtained had the following properties: $\eta$ spec. 0.87, content of carboxyl groups 27.3 m. val./kg., melting point 260.0° C., grayish. The material could be worked up into filaments or films. With chloroform 1.42% of soluble constituents were extracted.

EXAMPLE 2b (comparative ex.)

After the addition of 0.025 part of triphenyl phosphite and 0.03 part of powdery antimony (grain size about $1\mu$), the ester interchange mixture was polycondensed under the conditions described in Example 2. The final product had a specific viscosty of 0.25. Because of the low molecular weight it was not possible to produce fibers or films from the material.

EXAMPLE 3

0.025 part of triphenyl phosphite and 0.05 part of tin, which had been applied in the form of vapor to a film of polyethylene terephthalate having a thickness of $25\mu$ and a size of 81.5 cm.$^2$, were added in a vacuum reactor at 200° C. to an ester interchange mixture prepared as described in Example 1. The film was added in the form of squares having a size of 1 cm.$^2$. After a time of condensation of 4 hours under the reaction conditions specified in Example 1, a colorless polyester was obtained having the following properties: $\eta$ spec.=0.65, content of carboxyl groups 14.4 m. val./kg., melting point 261.0° C. The material could be worked up into drawable fibers and films having known properties. 0.75% were soluble in chloroform.

EXAMPLE 3a (comparative ex.)

A comparative example was carried out under identical conditions with the exception that instead of the film onto which tin had been vaporized 0.05 part of a metallic tin foil (diameter $20\mu$) was used as catalyst. A resin was obtained having a specific viscosity of about 0.19. Because of the low molecular weight the product could not be worked up into filaments or films.

EXAMPLE 3a (comparative ex.)

An experiment carried out with 0.05 part of powdery tin was condensation catalyst yielded a product having a specific viscosity of 0.20, which was unsuitable for the production of fibers or films owing to the shortness of the chains.

EXAMPLE 4

In the apparatus described in Example 1 under the reaction conditions defined in said example, 100 parts of terephthalic acid dimethyl ester and 80 parts of ethylene glycol were subjected to an ester interchange reaction in the presence of 0.023 part of zinc acetate ($x$2H$_2$O). The conversion in the ester interchange reaction, calculated on the amount of methanol split off, amount to 95% of the theory. The mixture was transferred in the molten state into the vacuum reactor described in Example 1, 0.025 part of triphenyl phosphite and 0.03 part of tin were added at 200° C. In a vaporizing apparatus and under a pressure of 10$^{-4}$ mm. of mercury the metal had been applied to a film of polyethylene terephthalate ($\eta$ spec. 0.65, melting point 260.5° C.) having a thickness of $25\mu$ and a size of 48.5 cm.$^2$. After dissolution of the carrier film, polycondensation was carried out as described in Example 1. After a time of reaction of 4 hours, the colorless filaments made from the reaction mixture had a specific viscosity of 0.65 and contained 14.4 m. val./kg. of carboxyl groups. From the polyethylene terephthalate obtained drawable filaments or films could be produced.

EXAMPLE 5

In the ester interchange mixture prepared as decribed in Example 1, 40 parts of ground polyethylene terephthalate waste film (grain size about 4 mm.$^2$) were dissolved at 200° C. After the addition of 0.025 parts of triphenyl phosphite to the melt transferred into the vacuum reactor, a film $25\mu$ thick and 85 cm.$^2$ large of polyethylene terephthalate, onto which 0.03 parts of antimony had been applied as vapor under reduced pressure and which had been cut to pieces of 1 cm.$^2$, was dissolved in the melt. Polycondensation was carried out under the conditions indicated in the following table:

| Time in minutes | Reduced pressure, mm. of mercury | Bath temperature, ° C. |
| --- | --- | --- |
| 0–10 | 660 | 273 |
| 10–20 | 560 | 273 |
| 20–30 | 460 | 273 |
| 30–40 | 360 | 274 |
| 40–50 | 260 | 275 |
| 50–60 | 160 | 275 |
| 60–70 | 120 | 275 |
| 70–80 | 80 | 275 |
| 80–90 | 60 | 276 |
| 90–100 | 40 | 276 |
| 100–110 | 20 | 276 |
| 110–120 | 1 | 276 |
| 120–230 | 0.4 | 277 |

The polycondensation product was colorless and free from fish-eyes. It had a specific viscosity of 0.88, a content of carboxyl groups of 17.0 m. val./kg. and a melting point of 260.5° C. The filaments made therefrom were colorless and lustrous. They could be drawn in the hot in a ratio of 1:4. 0.65% were soluble in chloroform.

Determination of the specific viscosity, the content of carboxyl groups and the thermostability 5 grams of the comminuted polyester were dried for 2 hours in a drying cabinet at 150° C. In a test tube provided with inlet the sample was scavenged for 8 minutes, with the exclusion of moisture, with a current of dried, chemically pure nitrogen. The tube was closed with a rubber stopper provided with a Bunsen valve. The sample was then dipped into a metal bath heated at 300° C. The residence time of the sample was 5 and 10 minutes. The tubes were then quenched by dipping them into cold water, the glass was broken and the samples were comminuted.

The specific viscosity of the material thus prepared was determined in an Ubbelohde viscometer with a 1% solution in a mixture of phenol/tetrachloroethane (mixing ratio 60:40) at 25° C. according to the known formula $$\eta\text{spec.} = \frac{T_1 - T_0}{T_0}$$

in which $T_1$ is the time of the solution to flow through at 25° C. and $T_0$ is the time of the solvent to flow through at 25° C.

The content of carboxyl groups was determined titrimetrically with sodium hydroxide solution using phenol red as indicator at room temperature. As solvent a mixture of equal parts of benzyl alcohol and chloroform was used.

The thermostability of the polyesters prepared according to the examples was defined by determining, in dependence of the residence time of the samples at 300° C., the degradation by the reduction of the specific viscosity and the increase of the carboxyl groups.

| Polyester according to Example | Residence time at 300° C., minutes | Specific viscosity | Content of carboxyl groups in m. val./kg |
|---|---|---|---|
| 1 | 0 | 0.85 | 10.8 |
|   | 5 | 0.70 | 19.7 |
|   | 10 | 0.70 | 24.3 |
| 2 | 0 | 0.56 | 19.0 |
|   | 5 | 0.52 | 28.4 |
|   | 10 | 0.49 | 33.2 |
| 2a | 0 | 0.87 | 27.3 |
|   | 5 | 0.63 | 53.8 |
|   | 10 | 0.59 | 57.3 |
| 3 | 0 | 0.65 | 17.0 |
|   | 5 | 0.60 | 26.8 |
|   | 10 | 0.50 | 34.3 |
| 5 | 0 | 0.88 | 17.0 |
|   | 5 | 0.78 | 28.8 |
|   | 10 | 0.70 | 36.4 |

What is claimed is:

1. A process for dispersing a solid metal catalyst in a polyethylene terephthalate melt, which comprises vapor depositing the solid catalyst on a solid organic fiber or film-forming material soluble in said melt, which solid organic material is used as a carrier for said vapor-deposited solid catalyst, introducing the combination of the solid organic carrier and the vapor-deposited catalyst into the melt, and intimately dispersing the solid catalyst by dissolution of the solid organic carrier material in said melt.

2. In a process of polycondensing bis ($\beta$-hydroxyethyl)-terephthalate by catalyzing the polycondensation thereof with antimony or tin, the improvement of which comprises dispersing said catalyst in a melt of bis ($\beta$-hydroxyethyl) terephthalate with a solid organic fiber or film-forming catalyst carrier having said catalyst vapor-deposited on said carrier.

3. The process according to claim 2 wherein the organic carrier is a terephthalate polyester.

4. The process according to claim 2 wherein the polycondensation is catalyzed with antimony metal.

References Cited

UNITED STATES PATENTS

| 2,456,228 | 12/1948 | Weaver | 260—9 |
| 2,727,882 | 12/1955 | Vodonik | 260—75 |
| 3,011,979 | 12/1961 | Warner | 252—359 |
| 3,095,403 | 6/1963 | Siggel et al. | 260—75 |

FOREIGN PATENTS

| 652,714 | 4/1964 | Belgium | 260—75 |

WILLIAM H. SHORT, Primary Examiner

E. WOODBERRY, Assistant Examiner

U.S. Cl. X.R.

117—107; 260—9, 16, 75, 873